United States Patent
Hosokawa et al.

(10) Patent No.: US 7,805,576 B2
(45) Date of Patent: Sep. 28, 2010

(54) INFORMATION PROCESSING SYSTEM, INFORMATION PROCESSING BOARD, AND METHOD OF UPDATING CACHE TAG AND SNOOP TAG

(75) Inventors: Yuka Hosokawa, Kawasaki (JP); Takaharu Ishizuka, Kawasaki (JP); Makoto Hataida, Kawasaki (JP); Toshikazu Ueki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 669 days.

(21) Appl. No.: 11/740,984

(22) Filed: Apr. 27, 2007

(65) Prior Publication Data

US 2008/0046662 A1 Feb. 21, 2008

(30) Foreign Application Priority Data

Aug. 17, 2006 (JP) .............................. 2006-222439

(51) Int. Cl.
    *G06F 12/08* (2006.01)
(52) U.S. Cl. ....................... 711/146; 711/118; 711/128; 711/141
(58) Field of Classification Search ................. 711/146, 711/118, 128, 141
    See application file for complete search history.

(56) References Cited

U.S. PATENT DOCUMENTS 5,765,199 A 6/1998 Chang et al.
5,860,109 A 1/1999 Hagersten et al.
6,292,870 B1 * 9/2001 Ishizuka et al. ............. 711/128

FOREIGN PATENT DOCUMENTS

| JP | 5-204869 | 8/1993 |
| JP | 5-265970 | 10/1993 |
| JP | 7-311711 | 11/1995 |
| JP | 10-214222 | 8/1998 |

OTHER PUBLICATIONS

Chinese Office Action issued on Sep. 5, 2008 in corresponding Chinese Patent Application No. 200710103962.X.

Extended European Search Report issued in corresponding European Patent Application No. 07106976.9, on Feb. 27, 2008.

* cited by examiner

*Primary Examiner*—Sanjiv Shah
*Assistant Examiner*—Jae U Yu
(74) *Attorney, Agent, or Firm*—Staas & Halsey LLP (57) ABSTRACT

In an information processing system loaded with a CPU having cache and a system controller having a copy of a tag of the cache (snoop tag), and the CPU not issuing replacement information about the cache tag, the number of WAYs of the snoop tags in the system controller is larger than the number of WAYs of the cache tags in the CPU to reduce a cache miss rate and suppress the degradation of performance by suppressing excess replacement of the cache tags in the CPU.

9 Claims, 11 Drawing Sheets

S108 
RE-OCCURRENCE OF READ REQUEST DUE TO CACHE MISS IN CPU2a.

S109 
SINCE THERE IS AVAILABLE SPACE IN CACHE TAG, CPU2a REQUESTS SC TO READ ADDRESS 6.

S110 
SINCE SNOOP TAG IS FULL, WAY [5a-1] IS TO BE REPLACED, AND ADDRESS 1 IS DELETED.
SC ISSUES EVICTION REQUEST TO CPU2a.

S111 
AT EVICTION REQUEST, CPU2a DELETES ADDRESS 1 IN WAY[3a-1].

S112 
SC UPDATES SNOOP TAG WAY [5a-1], AND TRANSMITS REQUESTED DATA TO CPU2a.

S113 
CPU2a RECEIVES DATA FROM SC, AND UPDATE CACHE TAG WAY [3a-2].

INFORMATION PROCESSING SYSTEM, INFORMATION PROCESSING BOARD, AND METHOD OF UPDATING CACHE TAG AND SNOOP TAG

CROSS REFERENCE TO RELATED APPLICATIONS

The present application claims priority to Japanese Patent Application No. 2006-222439, filed on Aug. 17, 2006, the entire contents of which are hereby incorporated herein by reference.

BACKGROUND OF THE INVENTION

1. Field of the Invention

The present invention relates to a tag configuration of a system in which a processor bus has a plurality of CPU cores and a system controller has a snoop tag as a copy of cache in a CPU.

2. Description of the Related Art

Generally, cache memory is used as means for improving the throughput in accessing main storage slower than a CPU. The cache memory is normally located between the CPU and the main storage, and is normally provided in the CPU.

When the cache memory is compared with a storage device (external memory) used in the main storage, the cache memory is higher in access speed, but has a smaller capacity. Therefore, the data stored in the cache memory is a part of all data held in the external memory.

If the cache memory stores data to be read, the data can be read at a high speed. However, unless there is data to be read in the cache memory, the data to be read is read by accessing the main storage, and the data is read at a lower speed.

The cache memory is configured by cache (data area, or cache data) storing a part of data stored in the main storage and tag memory (tag area, or cache tag) storing a part (tag) of the address of the data stored in the cache.

The processor is informed whether or not data required for execution is stored in the cache by comparing the address of the data with the tag in the tag memory. Unless necessary data is stored in the cache, the data is loaded into the cache from the main memory, and a part of the address of the data is loaded as a new tag into the tag memory. To load the new tag into the tag memory, it is necessary to expel the tag which is not required or is considered unnecessary.

The tag memory is formed by a plurality of ways (WAYs). To determine the tags to be expelled (to update the tags) before loading a new tag, the tag is assigned LRU (least recently used) information in advance.

For example, when a tag is written, an LRU information generation circuit generates the LRU information indicating the tag to be next replaced, and the information is written corresponding to the tag to the tag memory. Therefore, a line as a unit of a read/write to the tag memory stores a tag and its LRU information. When a new tag is loaded into the tag memory, a supplemented WAY information generation circuit determines which tag is to be supplemented to which way using the LRU information added to each tag.

A match determination circuit compares (a part of) the address of the data required by the processor with a predetermined tag stored in the tag memory, and determines whether or not the data is stored in the cache.

After the determination, (the line of) the tag read from the tag memory is written again to the tag memory. That is, the tag rewriting cycle is executed after the determination because it cannot be stated that the LRU information is correct LRU information reflecting the result of the determination unless the LRU information about the line of the tag is rewritten to the tag memory. Then, based on the result of the hit/mishit of the line, the LRU information generation circuit generates new LRU information and stores it in the tag memory. Thus, the LRU control of writing a new tag using the LRU information is performed.

Figure 1:
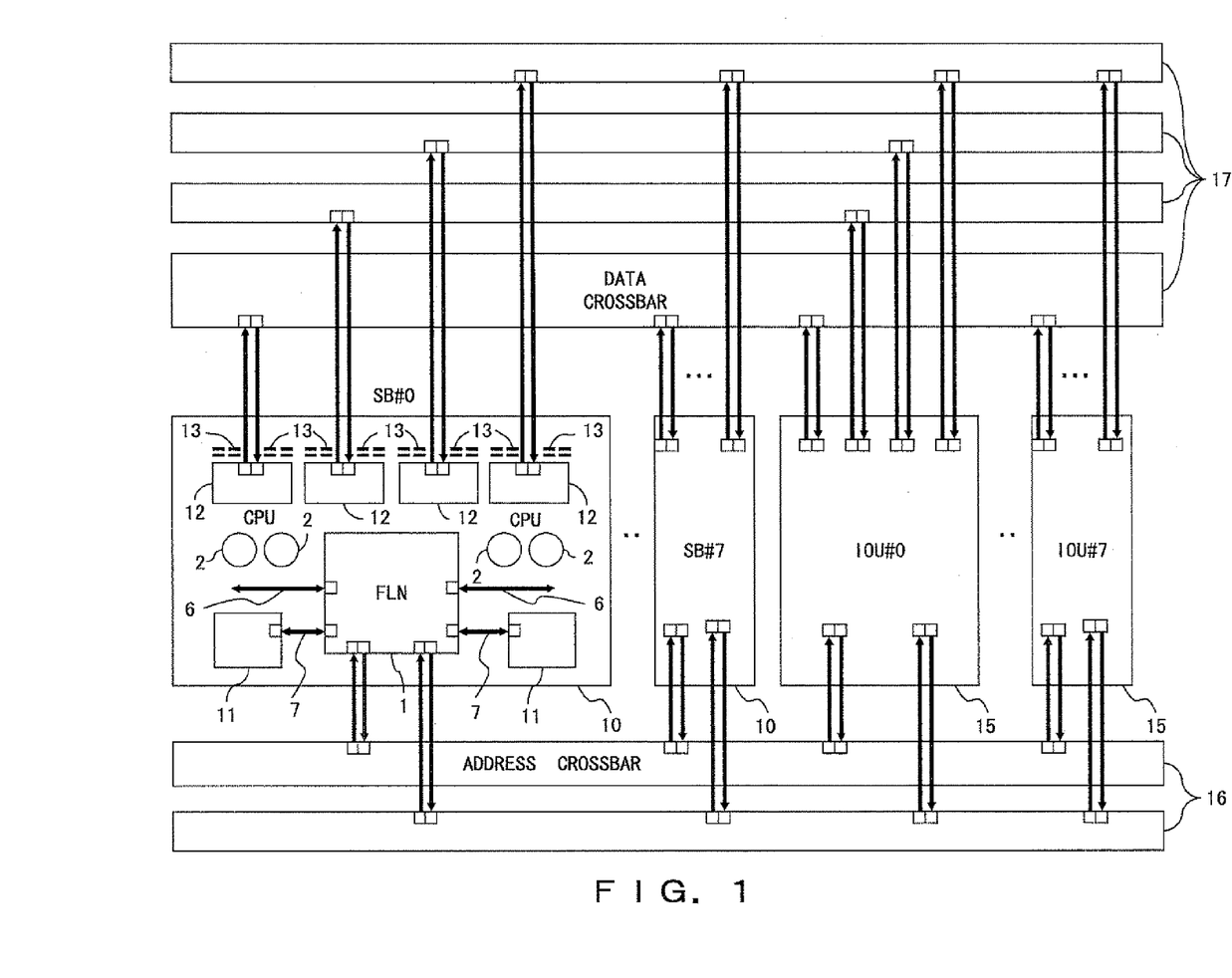
FIG. 1 shows the entire information processing system (chip set) having a common multiprocessor configuration.

FIG. 1 shows the entire information processing system (chip set) provided with a common multiprocessor configuration. In FIG. 1, the information processing system mainly includes a system board 10, an input/output control unit 15, a data cross bar 17, and an address cross bar 16. The system board 10 includes a system controller 1, a firmware hub 11, a CPU 2, a memory controller 12, memory 13, a CPU bus 6, and a firmware hub bus 7.

The CPU bus 6 connects the system controller 1 to the CPU 2. The firmware hub bus 7 connects the system controller 1 to the firmware hub bus 7. The data cross bar 17 is a bus for transmitting data to or receiving data from the system board 10. The address cross bar 16 is a bus for transmitting an address to or receiving an address from the system board 10.

The system controller 1 is a device for controlling transmission/reception of data between the CPU 2 and the memory 13. The firmware hub 11 stores firmware. The memory controller 12 controls the operation of the memory 13.

Figure 2:
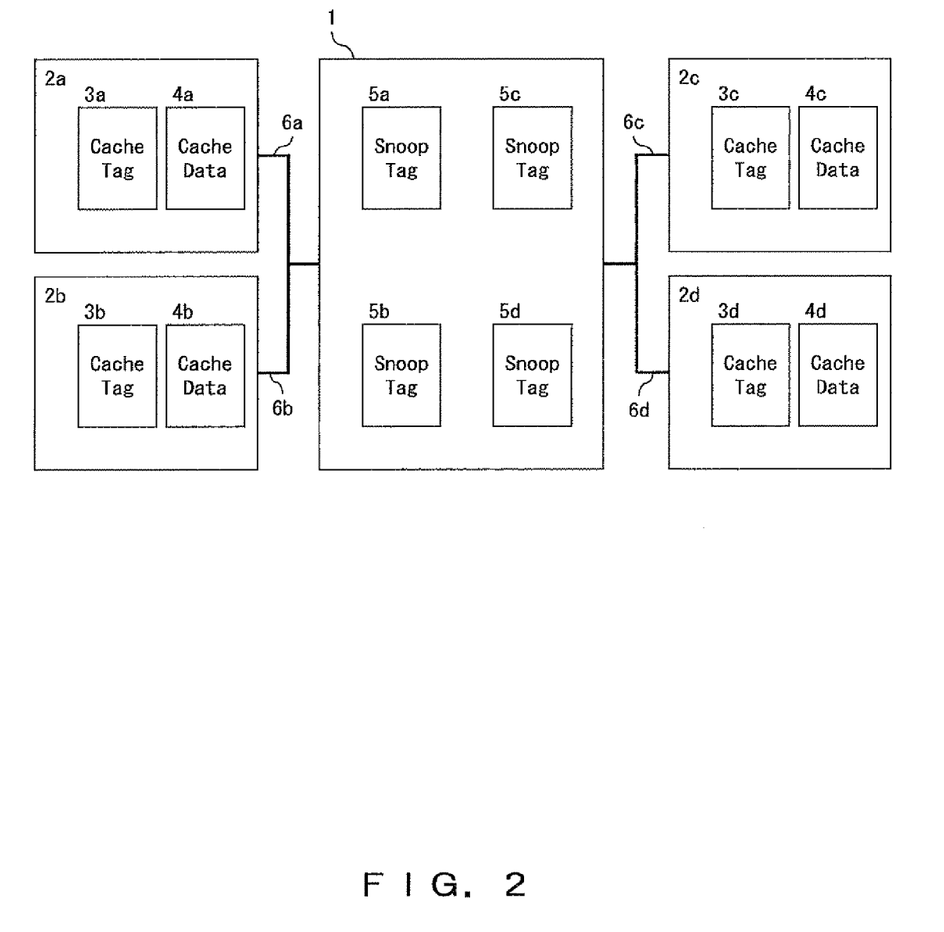
FIG. 2 shows a tag in the information processing system.

FIG. 2 shows the tag in the information processing system. In FIG. 2, the system controller 1 is connected to the CPUs 2a, 2b, 2c, and 2d via the CPU buses 6a, 6b, 6c, and 6d. Each CPU 2 (2a, 2b, 2c, and 2d) is provided with cache memory. The cache memory of each CPU 2 is configured by a cache tag 3 (3a, 3b, 3c, and 3d) and cache data 4 (4a, 4b, 4c, and 4d).

The system controller 1 is provided with a snoop tag 5 (5a, 5b, 5c, and 5d) corresponding to each cache tag 3 (3a, 3b, 3c, and 3d).

The system controller 1 confirms whether or not the data as a target of a read request is held by other snoop tags snoop tags 5b, 5c, and 5d, for example, if the CPU 2a issues the read request when a cache miss occurs. When the data as a target of the read request is held by other snoop tags snoop tags 5b, 5c, and 5d, the system controller 1 acquires replacement information corresponding to the replace request from the snoop tag 5 holding the tag and passes it to the CPU 2a. However, if no snoop tag 5 holds the data as a target of the read request, the system controller 1 acquires the replacement information corresponding to the read request from the main storage, and passes it to the CPU 2a.

Figure 3:
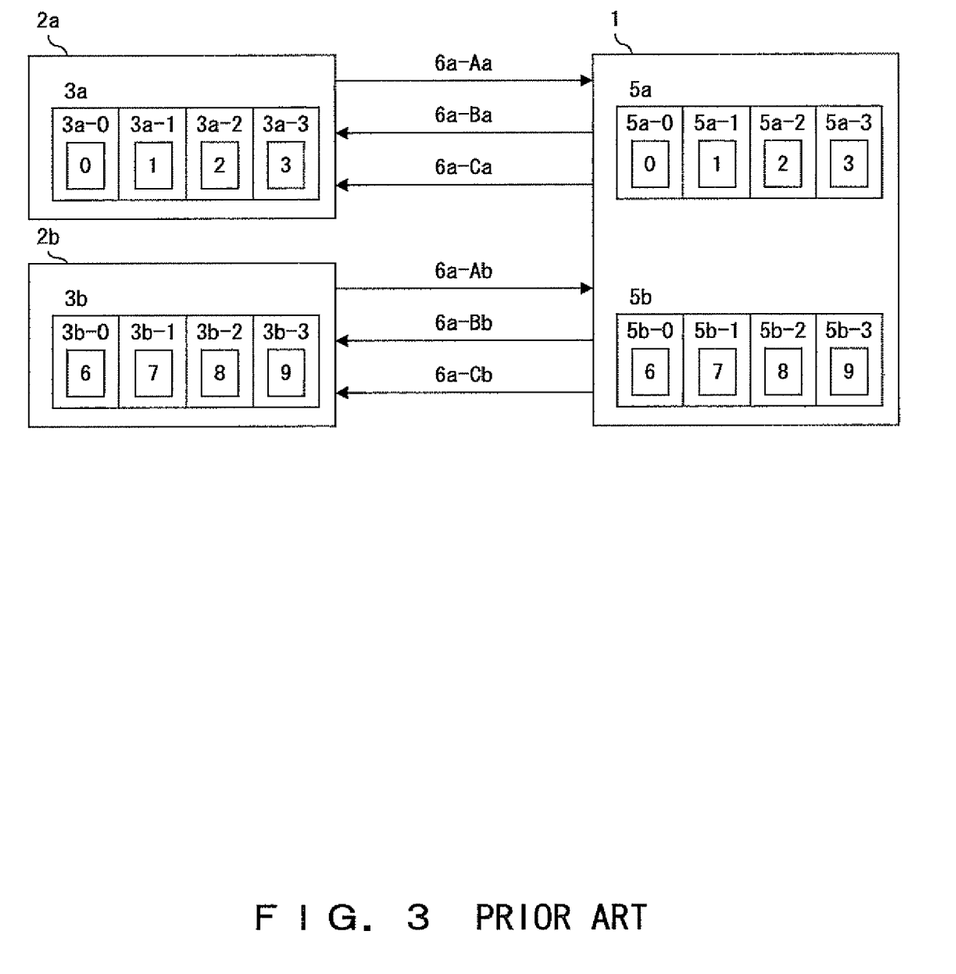
FIG. 3 shows an example of the conventional configuration of the tag.

FIG. 3 shows an example of the configuration of a conventional tag. Mainly the CPU 2a shown in FIG. 3 is explained below. The cache tag 3a in the CPU 2a is formed by, for example, four WAYs (3a-0, 3a-1, 3a-2, and 3a-3).

On the other hand, the snoop tag 5a of the system controller 1 corresponding to the cache tag 3a is also formed by four WAYs (5a-0, 5a-1, 5a-2, and 5a-3). Thus, in the conventional configuration, the cache tag 3 of the CPU 2 has the same number of WAYs as the snoop tag 5 of the system controller 1. In this case, the following event can occur.

First, if the cache tag 3 is full (that is, all WAYs forming the cache tag are in the write state) when a read request is issued (6a-Aa) after a cache miss from the CPU 2 to the system controller 1, then the CPU 2 expels the address from any of the WAY forming cache tag 3, and replaces it with the address of data as a target of a read request (replacement information).

In the above-mentioned system, there is no means for notifying the system controller 1 from the CPU 2 of the replacement information about the address of which WAY is expelled, or the replacement information is not always notified even granting that there is the means.

Therefore, in the system having no means of notifying the system controller 1 from the CPU 2 of the replacement information or having the system provided with a protocol in which delete information is not always given without fail although there is such means, the system controller 1 uniquely determines a snoop tag to be replaced.

Figure 4A:
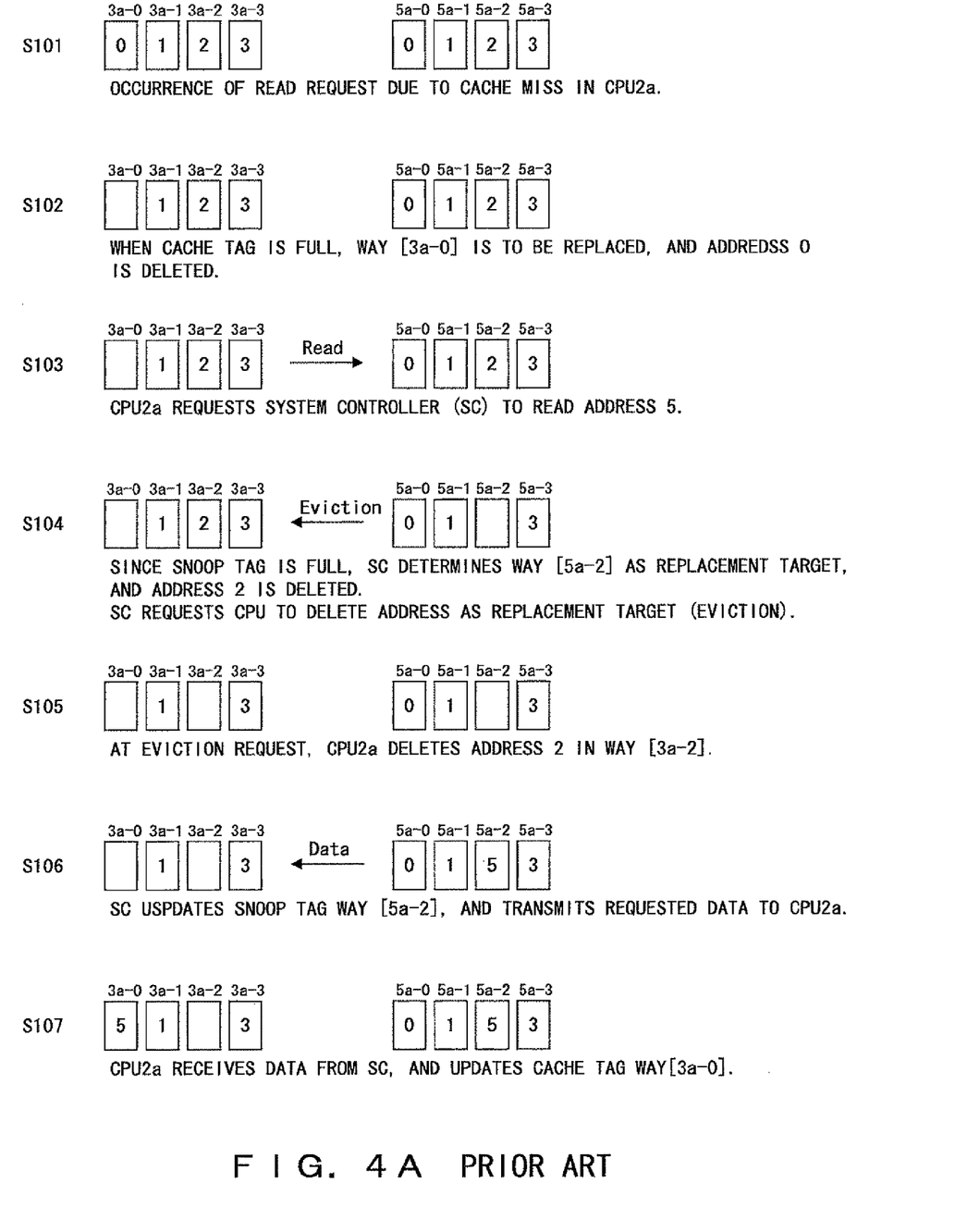
FIG. 4A shows an example (1) of updating a tag when a cache miss occurs in the conventional technology.
Figure 4B:
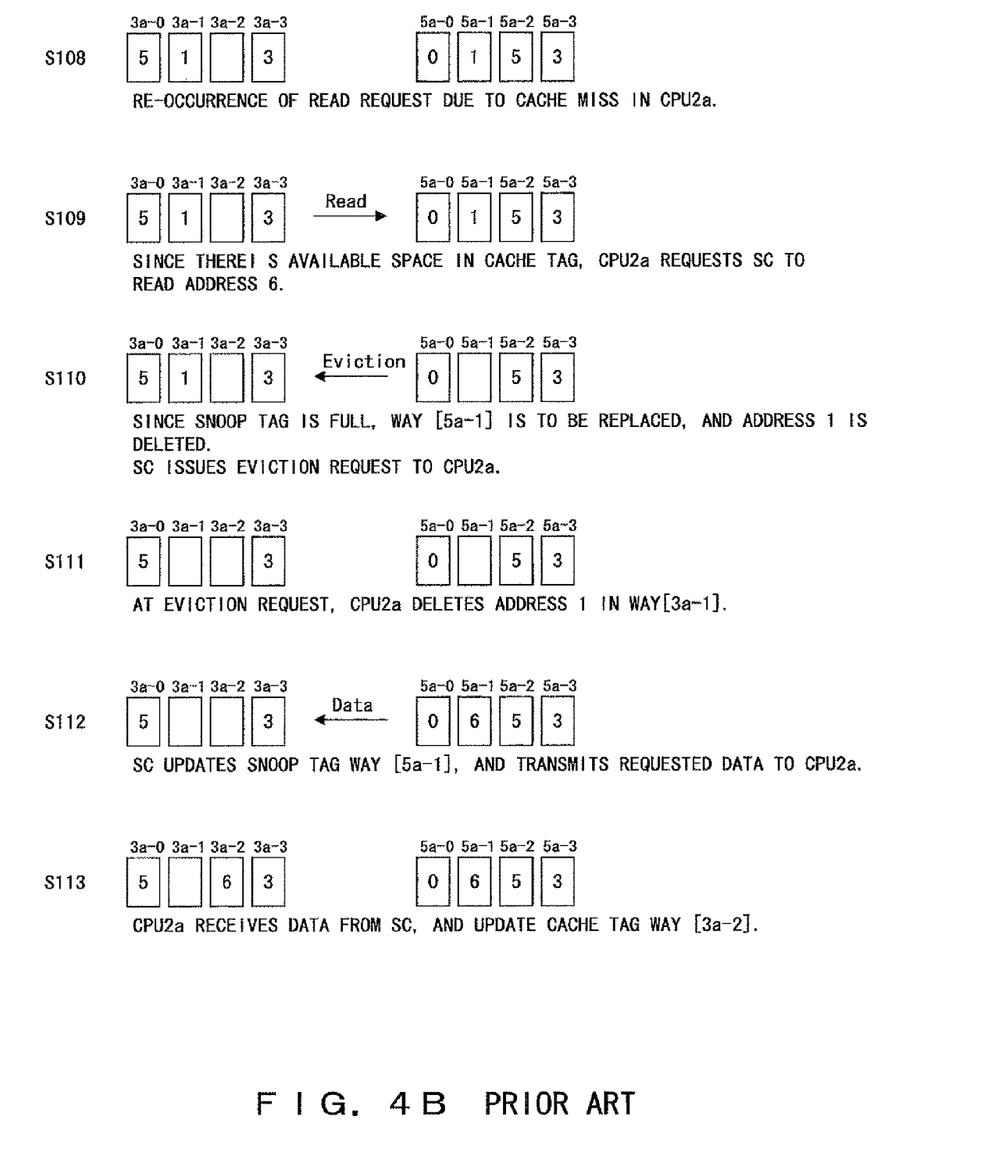
FIG. 4B shows an example (2) of updating a tag when a cache miss occurs in the conventional technology.

FIGS. 4A and 4B show an update example of a tag when a cache miss occurs in the conventional technology. Each of the four WAYs (3a-0, 3a-1, 3a-2, and 3a-3) forming the cache tag 3a in the CPU 2a stores an address (0, 1, 2, and 3) (the cache tag 3a in the CPU 2a is in the full state).

First, a read request is issued in the CPU 2a after a cache miss. For example, a read request for an address 5 is issued (step 101. Hereinafter, a "step" is referred to as "S").

Then, the CPU 2a determines, for example, the WAY[3a-0] of the cache tag 3a to be replaced, and deletes the address information (address 0) stored in the WAY [3a-0] (S102).

The CPU 2a issues to the system controller 1 a read request for the address information (address 5) generated in S101 (S103).

In this example, since addresses are written to all WAYs of the snoop tag 5a (full state), it is necessary to delete any WAY as a target to be replaced.

However, in the system receiving no replace request from the CPU 2a, it is necessary for the system controller 1 to forcibly determine the address of which WAY of the snoop tag is to be replaced.

Then, the system controller 1 determines, for example, the WAY [5a-2] to be replaced, and deletes the address information (address 2) stored in the WAY [5a-2].

The address stored in the WAY [5a-2] to be replaced is also a target to be replaced in the cache tag 3a in the CPU 2a. Therefore, the system controller 1 requests (eviction request) the CPU 2a to delete the address (address 2) to be replaced (S104).

Upon receipt of the eviction request, the CPU 2a analyzes the command, and deletes the address information (address 2) about the WAY [3a-2] of the cache tag 3a (S105).

The system controller 1 updates the WAY [5a-2] of the snoop tag 5a (the address 5 is stored in the WAY [5a-2]). Then, the system controller 1 transmits the data corresponding to the address information to the CPU 2a (S106).

The CPU 2a receives the data from the system controller 1, writes the data to the cache data 4a, and updates the WAY [3a-0] of the cache tag 3a by the address corresponding to the data (S107).

A read request is issued after a cache miss in the CPU 2a again. For example, a read request for an address 6 is issued (S108). At this time, since there is available space in the cache tag 3 (WAY [3a-2]), the deleting process described in S102 is not performed, but the CPU 2a issues a read request for the address 6 to the system controller 1 (S109).

Then, since the snoop tag 5a is full, the system controller 1 deletes the address information (address 1) stored in the WAY [5a-1] when, for example, the WAY [5a-1] is determined as a replacement target.

The address stored in the WAY [5a-1] to be replaced is also a replacement target in the cache tag 3a. Therefore, the system controller 1 requests the CPU 2a to delete the address (address 1) to be replaced (eviction request) (S110).

Upon receipt of the eviction request, the CPU 2a analyzes the command, and deletes the address information (address 1) stored in the WAY [3a-1] of the cache tag 3a (S111).

The system controller 1 updates the WAY [5a-1] of the snoop tag 5a (the address 6 is stored in the WAY [5a-1]). Then, the system controller 1 transmits the data corresponding to the address to the CPU 2a (S112).

The CPU 2a receives the data from the system controller 1, writes it to the cache data 4a, and updates the WAY [3a-0] of the cache tag 3a by the address corresponding to the data (S113).

Thus, with the conventional configuration, the replacement target of the CPU 2 does not always match that of the system controller 1. Accordingly, the CPU 2 allows excess replacement. As a result, there can be a plurality of available WAYs, thereby possibly raising a cache miss rate.

Meanwhile, the documents relating to the related art in this technical field can be the Japanese Published Patent Application No. H5-204869, the Japanese Published Patent Application No. H7-311711, the Japanese Published Patent Application No. H10-214222, and the Japanese Published Patent Application No. H5-265970.

SUMMARY OF THE INVENTION

The present invention aims at reducing the cache miss rate and suppressing the degradation of the performance by preventing excess replacement of a cache tag in the CPU in the information processing system in which the information stored in which WAY is expelled is not notified from the CPU to the system controller.

The information processing system according to the present invention includes:

one or more processors having cache memory including a cache tag having a plurality of ways and a cache data area, executing an externally received instruction, and processing data; and a processor control device transmitting a reply to the processors at a read request from the processors, having a snoop tag as tag information corresponding to the cache tag of the processor, and having the number of ways of the snoop tag larger than the number of ways of the cache tag of the processor.

The method of updating a cache tag and a snoop tag of the information processing system having one or more processors including cache memory of a plurality of ways formed by a cache tag and a cache data area and executing an instruction and processing data, and a processor control device for transmitting information to the processors at a request from the processors, and having the number of ways of the snoop tag as tag information corresponding to the cache tag of each processor larger than the number of ways of the cache tag of the processors transmits the data corresponding to the address information to the processors by the processor control device updating available ways according to the address information as a target of a read request if the processors issue the read request when a cache miss occurs and there are the available ways of the snoop tag.

The information processing board according to the present invention includes:

one or more processors having cache memory including a cache tag having a plurality of ways and a cache data area, executing an externally received instruction, and processing data; and a processor control device transmitting a reply to the processors at a read request from the processors, having a snoop tag as tag information corresponding to the cache tag of the processor, and having the number of ways of the snoop tag larger than the number of ways of the cache tag of the processor.

DESCRIPTION OF THE PREFERRED EMBODIMENTS

The information processing system according to the present invention includes: one or more processors having cache memory including a cache tag having a plurality of ways and a cache data area, executing an externally received instruction, and processing data; and a processor control device transmitting a reply to the processors at a read request from the processors, having a snoop tag as tag information corresponding to the cache tag of the processor, and having the number of ways of the snoop tag larger than the number of ways of the cache tag of the processor.

With the above-mentioned configuration, the cache miss rate can be reduced.

The information processing system transmits data corresponding to address information to the processors by the processor control device updating available ways according to the address information as a target of a read request if the processors issue the read request when a cache miss occurs and there are available ways of the snoop tag.

With the above-mentioned configuration, the replacement of a snoop tag can be reduced, thereby decreasing the cache miss rate.

In the information processing system, during the update of available ways, no request to delete arbitrarily address information from a way storing the arbitrarily address information is not issued from the processor control device to the processor.

With the above-mentioned configuration, no eviction request is transmitted to the CPU. Therefore, unnecessary deletion of WAYs of a cache tag on the CPU side can be suppressed.

In the information processing system, when the processor issues a read request when a cache miss occurs, and if there is no available way of the snoop tag, the processor control device deletes any of the address information stored in the way of the snoop tag, and notifies the processor of the information that the address information is deleted.

With the configuration, since the number of WAYs of the snoop tag is larger than the number of WAYs of the cache tag. Therefore, as the snoop tag is updated, the stored contents of the snoop tag and the cache tag are conspicuously different, and the possibility that the same addresses exist in the both tags as compared with the conventional technology.

In the information processing system, the information that the address information stored in any way of the cache tag is expelled is not transmitted from the processor to the processor control device.

With the configuration, an event that an excess available WAY occurs in this system can be suppressed.

The present invention provides an information processing system having the number of WAYs stored in the snoop tag in the system controller larger than the number of WAYs in the CPU cache. Thus, excess replacement of the tags in the CPU can be suppressed.

Described below are the details of the mode for embodying the present invention.

Figure 5:
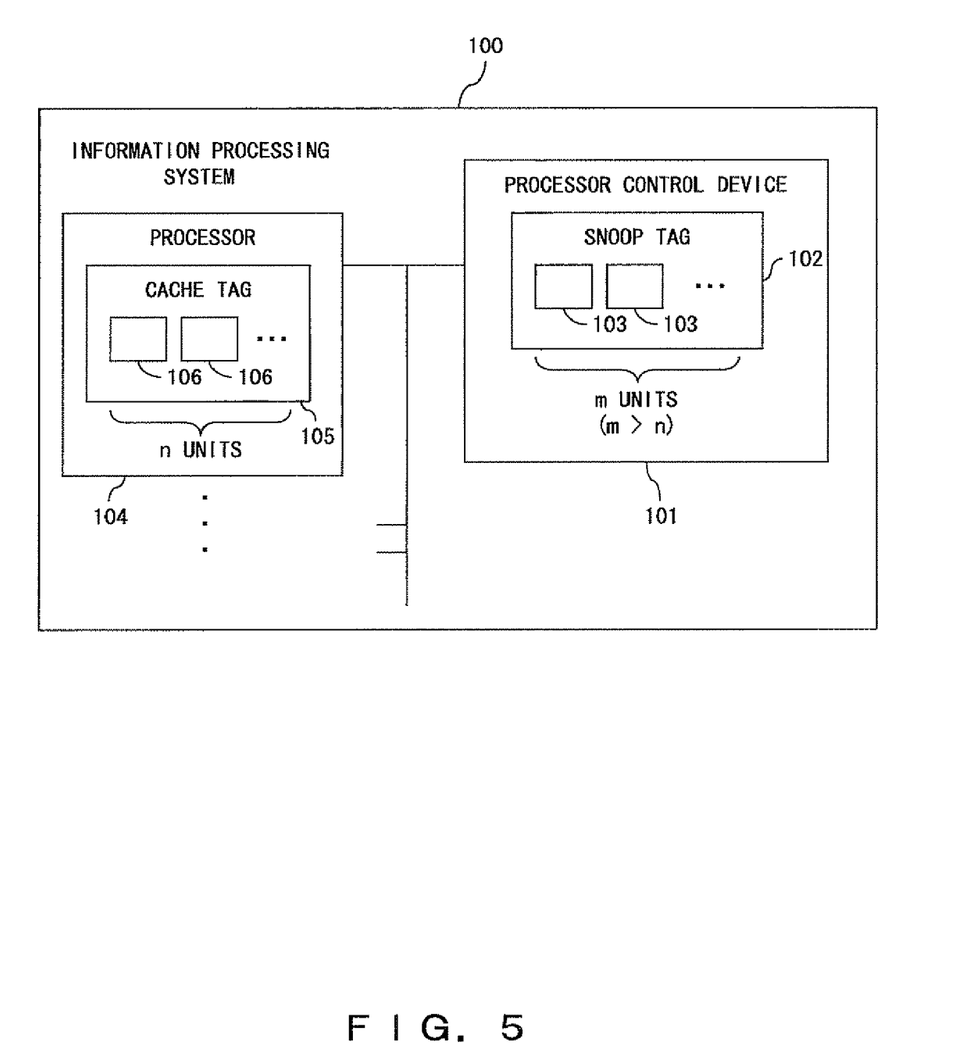
FIG. 5 shows the concept of the configuration of the information processing system according to a mode for embodying the present invention.

FIG. 5 shows the concept of the configuration of the information processing system according to a mode for embodying the present invention. The mode for embodying the present invention is an information processing system having a chip set loaded with a CPU having cache, and a system controller having a copy of the tag of the cache (hereinafter referred to as a snoop tag), and is based on the information processing system having the CPU that issues no replacement information about a cache tag.

An information processing system 100 according to a mode for embodying the present invention is provided with one or more processors 104 and a processor control device 101.

The processor 104 has cache memory which includes a cache tag 105 including a plurality of ways 106 and cache data, executes externally received information, and processes data.

The processor control device 101 transmits a reply to the processor 104 on the basis of a read request from the processor 104. The processor control device 101 has a snoop tag 102 as tag information corresponding to the cache tag 105 of each processor 104. The number of ways 103 (m: any integer) of the snoop tag 102 is larger than the number of the ways 106 (n: any integer) of the cache tag 105 (m>n).

If there is a read request from the processor 104 when a cache miss occurs, the processor control device 101, and if there is available way 103 of the snoop tag 102, then it updates the available way according to the address information about the data as a target of the read request, and can transmit data corresponding to the address information to the processor 104.

When the available way is updated, a request to delete the address information from the way storing predetermined address information in the ways 106 of the cache tag 105 is not issued from the processor control device 101 to the processor 104.

Thus, since the replacement of the snoop tag 102 can be reduced, the cache miss rate can be decreased. In addition, since an eviction request is not reported to the CPU, unnecessary deletion of the WAY of the cache tag on the CPU side can be suppressed.

If there is a read request from the processor 104 when a cache miss occurs, and there is no available way 103 of the snoop tag 102, then the processor control device 101 deletes any of the address information stored in the way 103 of the snoop tag 102, and notifies the processor 104 of the information (eviction request) that the address information is to be deleted.

In the present invention, a snoop tag stores the same contents as the cache tag. However, since the number of WAYs of the snoop tag is larger than the number of the WAYs of the cache tag, an address not stored in the cache is stored. Therefore, there is the possibility that when the snoop tag is full, the optionally selected WAY is the address not stored on the cache side. Accordingly, when an eviction request is issued from the system controller, there is a lower possibility that the address specified by the eviction request is stored on the cache side, and there is a lower possibility that the process of deleting the address of the WAY of the cache tag is performed. As a result, there is a lower possibility that there is an available WAY of a cache tag, thereby decreasing the cache miss rate.

Described below is a mode for embodying the present invention.

Figure 6:
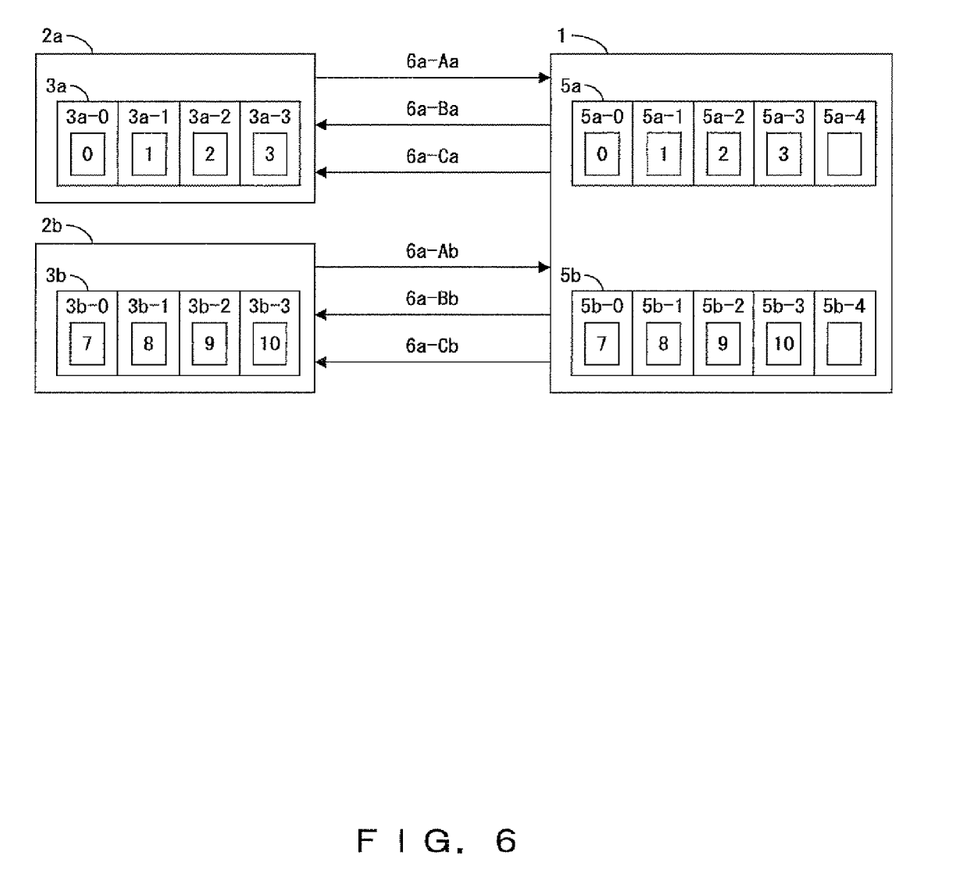
FIG. 6 shows the configuration of the tag in the information processing system according to a mode for embodying the present invention.

FIG. 6 shows the configuration of the tag of the information processing system according to a mode for embodying the present invention. As compared with FIG. 3, the number of WAYs of the snoop tags 2a and 2b in the system controller 1 is larger by one than the number of WAYs of the cache tags 3a and 3b in the CPUs 2a and 2b. That is, in the present mode for embodying the present invention, the number of WAYs of the cache tags 3a and 3b in the CPUs 2a and 2b is 4 while the number of WAYs of the snoop tags 5a and 5b in the system controller 1 is 5.

In FIG. 6, 6a-Aa, 6a-Ab indicates a cache read request from the CPUs 2a and 2b. 6a-Ba, 6a-Bb indicates an eviction request from the system controller 1. 6c-Ca, 6a-Cb indicates the cache data transmitted to the CPUs 2a and 2b.

Figure 7A:
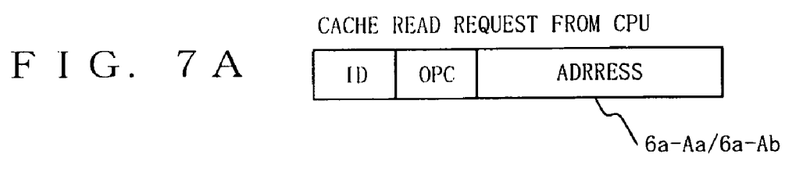
FIG. 7A shows the format of a packet of a cache read request.
Figure 7B:
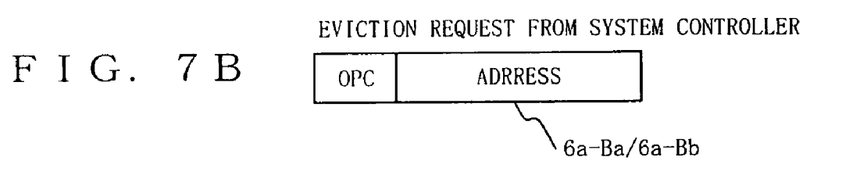
FIG. 7B shows the format of a packet of a eviction request.
Figure 7C:
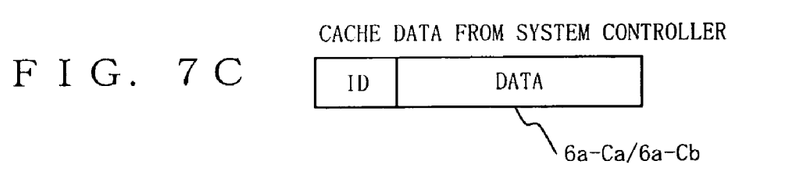
FIG. 7C shows the format of a packet of a cache data.

FIGS. 7A-7C show the packet formats of a cache read request, an eviction request, and cache data. FIG. 7A shows the packet format of the cache read request 6a-Aa, 6a-Ab from the CPU. The cache read request is configured by an [ID] field, an [OPC] field, and an [address] field. The [ID] field stores the information identifying from which CPU the read request has been issued. The [OPC] field stores a read instruction. The [address] field stores the address of the main memory storing the data as a target of the read request.

FIG. 7B shows the packet format of the eviction request 6a-Ba, 6a-Bb from the system controller. The eviction request is configured by an [OPC] field and an [address] field. The [OPC] field stores an eviction instruction. The [address] field stores the same address as the WAY of the snoop tag to be replaced.

FIG. 7C shows the packet format of the cache data 6c-Ca, 6a-Cb transmitted from the system controller to the CPU. The cache data is configured by an [ID] field and a [data] field. The [data] field stores data.

Figure 8A:
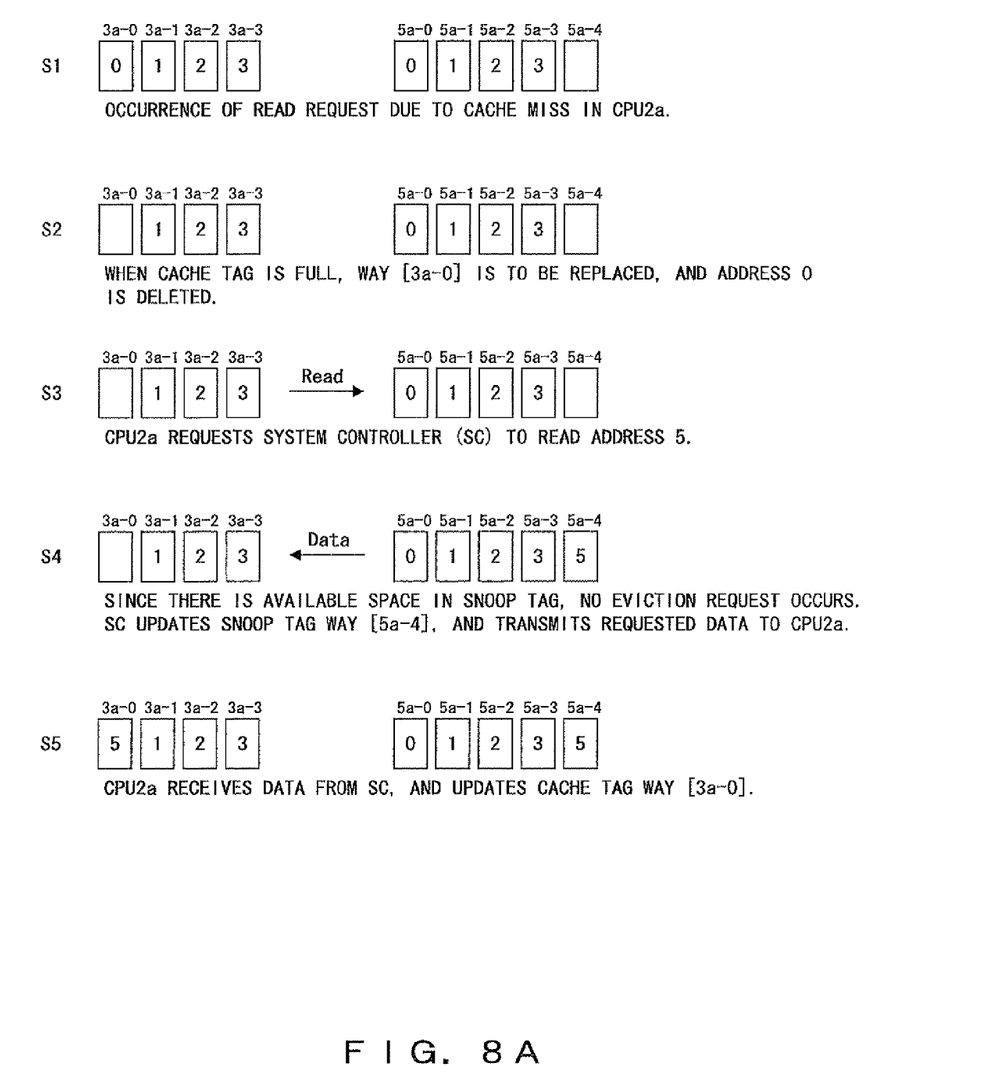
FIG. 8A shows an example (1) of updating a tag when a cache miss occurs according to a mode for embodying the present invention.
Figure 8B:
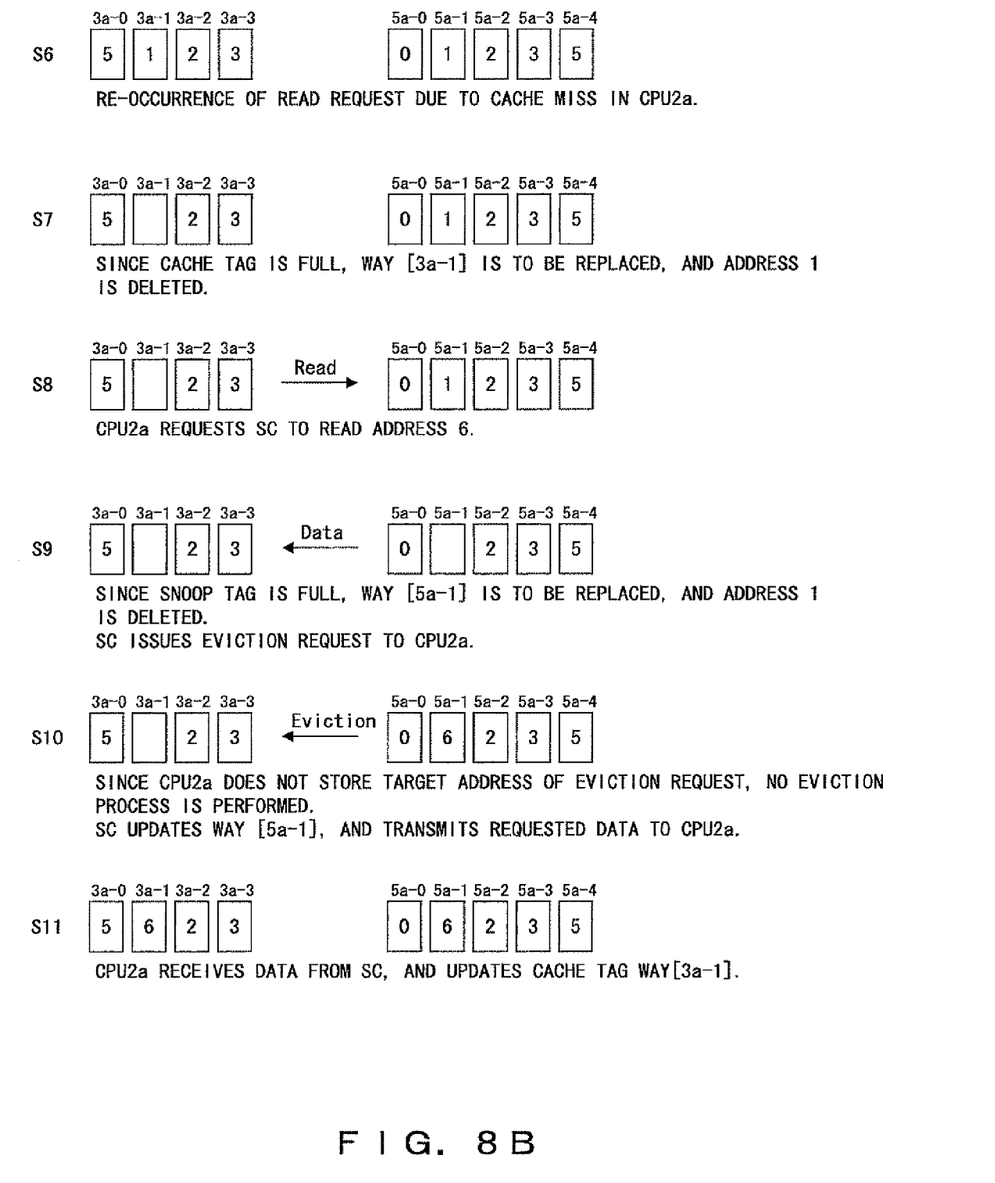
FIG. 8B shows an example (2) of updating a tag when a cache miss occurs according to a mode for embodying the present invention.

FIGS. 8A and 8B show examples of updating the tag when a cache miss occurs according to the present mode for embodying the present invention. Described below are mainly the cache tag 3a and the snoop tag 5a corresponding to the cache tag 3a for convenience in explanation.

First, the cache tag 3a in the CPU 2a is configured by 4 WAYs. Each WAY (3a-0, 3a-1, 3a-2, and 3a-3) stores an address (0,1,2, and 3) (the cache tag 3a in the CPU 2 is in the full state).

On the other hand, the snoop tag 5a is configured by 5 WAYS, 4 WAYs (5a-0, 5a-1, 5a-2, and 5a-3) of which respectively store addresses (0. 1, 2, and 3). The WAY [5a-4] of the snoop tag 5a is available.

First, in the CPU 2a, a read request is issued when a cache miss occurs. For example, a read request for the data corresponding to the address 5 is issued (S1).

Then, the CPU 2a determines, for example, the WAY [3a-0] of the cache tag 3a as a replacement target, and deletes the address information (address 0) stored in the WAY [3a-0] (S2).

The CPU 2a issues to the system controller 1 a read request for the address information (address 5) generated in S1 (S3).

Assume that the system according to the present mode for embodying the present invention is a system not issuing a replace request from the CPU 2a. In this case, if the snoop tag 5a is full, it is necessary for the system controller to delete the address information about any WAY in the snoop tag. However, since the WAY [5a-4] of the snoop tag 5a is available in the status in S3, it is not necessary to perform the process of deleting the information about the WAY of the snoop tag 5a. Accordingly, an eviction request to the CPU 2a relating to the deleting process is not issued.

In this case, the system controller 1 updates the WAY [5a-4] of the snoop tag 5a, and the address 5 is stored in the WAY [5a-4]. Furthermore, the system controller 1 transmits the target data of the read request corresponding to the address to the CPU 2a (S4).

The CPU 2a receives the data from the system controller 1, writes the data to the cache data 4a, and updates the WAY [3a-0] of the cache tag 3a according to the address (address 5) corresponding to the data (S5).

Again, the CPU 2a issues a read request after a cache miss. For example, a read request for the address 6 is issued (S6). At this time, since the cache tag 3a is full, the CPU 2a, for example, determines the WAY [3a-1] of the cache tag 3a as a replacement target, and deletes the address information (address 1) stored in the WAY [3a-1] (S7).

Then, the CPU 2a issues to the system controller 1 a read request for data corresponding to the address 6 (S8).

Since the snoop tag 5a is full in the state in S8, the system controller 1 determines, for example, the WAY [5a-1] as a replacement target, and deletes the address information (address 1) stored in the WAY [5a-1].

The address information stored in the WAY [5a-1] as a replacement target is also to be replaced in the cache tag 3a. Therefore, the system controller 1 issues to the CPU 2a a request to delete the address (address 1) to be replaced (eviction request) (S9).

Then, the CPU 2a receives the eviction request. However, since the CPU 2a does not hold the target address of the eviction request, no eviction process is performed. Then, the system controller 1 updates the WAY [5a-1] of the snoop tag 5a, and the address 6 is stored in the WAY [5a-1] of the snoop tag 5a. Furthermore, the system controller 1 transmits the target data of the read request corresponding to the address to the CPU 2a (S10).

The CPU 2a receives the data from the system controller 1, writes the data to the cache data 4a, updates the WAY [3a-0] of the cache tag 3a according to the address corresponding to the data, and the address 6 is stored in the WAY [3a-2] of the cache tag 3a (S11).

Thus, if a cache miss occurs when the cache tag 3a is full, then the replacement of the cache tag 3a is performed only immediately after a read request is issued due to a cache miss. That is, there is only one available WAY in the cache tag 3a when the tag is updated, and two or more available WAYs are not detected, thereby excess replacement is not performed. The explanation given by referring to FIGS. 8A and 8B is given in detail by referring to FIG. 9.

Figure 9:
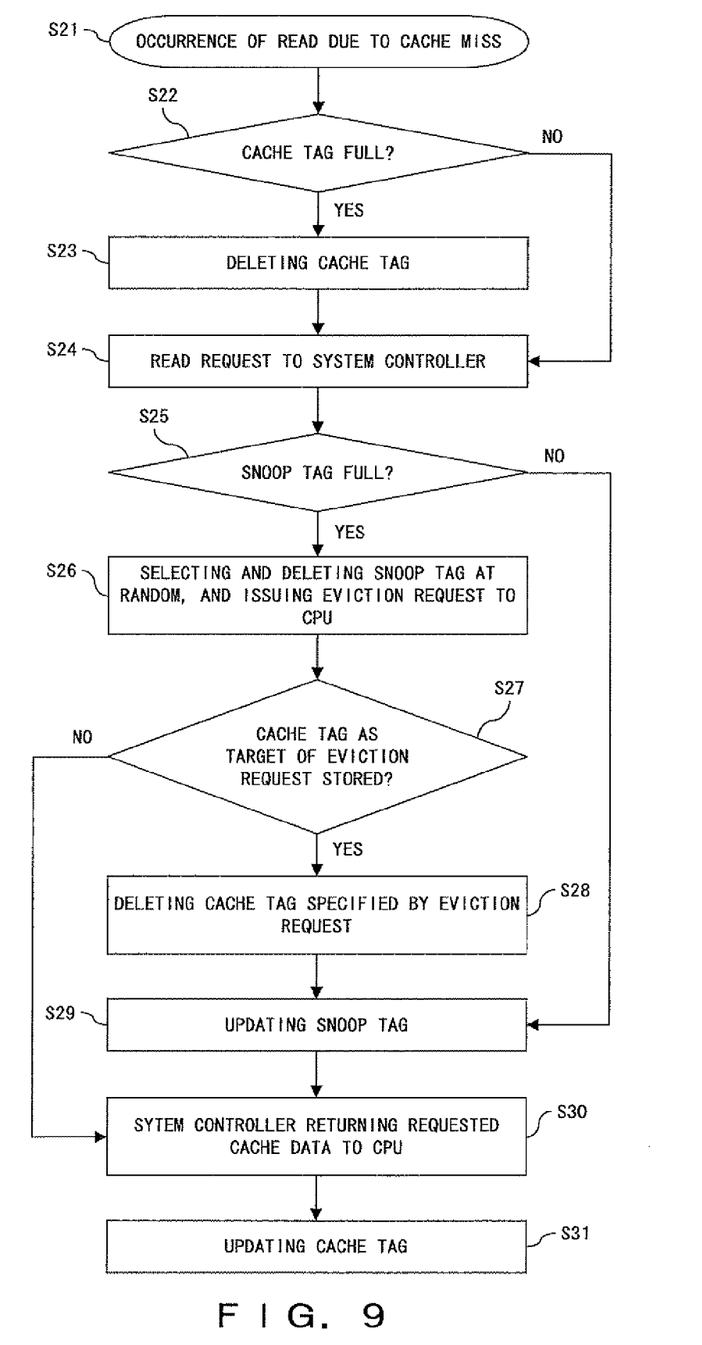
FIG. 9 is a flowchart of updating a tag when a cache miss occurs according to a mode for embodying the present invention.

FIG. 9 is a flowchart of updating a tag when a cache miss occurs according to the present mode for embodying the present invention. First, in CPU 2, a read request due to a cache miss is issued (S21). Then, the CPU 2 determine whether or not the cache tag 3 is full (522).

Unless the cache tag 3 is full, that is, if there is an available WAY in the cache tag 3 ("NO" in S22), then control is passed to S24.

If the cache tag 3 is full, that is, if there is no available WAY in the cache tag 3 ("YES" in S22), and an optional WAY is deleted from the cache tag 3 (S23). At this time, a WAY can be deleted in, for example, the LRU (least recently used) system and other well-known systems.

Next, the CPU 2 issues a read request to the system controller 1 (S24). The system controller 1 determines whether or not the snoop tag 5 corresponding to the CPU 2 which has issued the read request is full (S25).

Unless the snoop tag 5 is full, that is, if there is an available WAY in the snoop tag 5 ("NO" in S25), the system controller 1 updates the available WAY, and the address as a target of the read request is stored in the available WAY (S29).

When the snoop tag 5 is full, that is, when there is no available WAY ("YES" in S25), the system controller 1 selects a WAY in the snoop tag 5 at random, and deletes the address stored in the selected WAY. Furthermore, the system controller 1 issues an eviction request to the CPU 2 that has issued the read request (S26).

Thus, the CPU 2 determines whether or not the address as a target of the eviction request is stored in the cache tag 3 (S27).

Unless the address as a target of the eviction request is stored in the cache tag 3 ("NO" in S27), control is passed to S30.

If the address as a target of the eviction request is stored in the cache tag 3 ("YES" in S27), the CPU 2 deletes the address of the WAY of the cache tag 3 storing the address as a target of the eviction request (S28). Then, the system controller 1 updates the WAY of the snoop tag 5 deleted in S26 (S29).

Then, the system controller 1 transmits the data specified in the read request to the CPU 2 that has issued the read request (S30), and updates the WAY of the cache tag 3 according to the address corresponding to the transmitted data (S31).

In the present mode for embodying the present invention, the number of WAYs of the snoop tag 5 in the system controller 1 is one larger than the number of WAYs of the cache tag 3 in the CPU 2, but the relationship between the numbers of WAYs is not limited to this application. That is, it is accepted if the number of WAYs of the snoop tag 5 is larger than the number of WAYs of the cache tag 3.

Furthermore, although the same contents are stored in the snoop tag and the cache tag, the snoop tag can store those addresses not stored in the cache because the number of WAYs of the snoop tag 5 is larger than the number of WAYs of the cache tag 3. Therefore, if the snoop tag is full, there is the possibility that an optionally selected WAY can be an address not stored on the cache side. Therefore, when an eviction request is issued from the system controller, there is a lower possibility that the address specified in the eviction request is stored on the cache side. As a result, there is a lower possibility that the process of deleting an address of a WAY of a cache tag is deleted. Accordingly, there is a lower possibility that there is an available WAY of a cache tag, thereby reducing the cache miss rate.

The present invention is not limited to the above-mentioned mode for embodying the present invention, but can be realized with various configurations or aspects within the scope of the gist of the present invention.

According to the present invention, the replacement of the snoop tag 5 in the system controller 1 can be reduced. As a result, excess replacement performed when the cache tag 3 in the CPU 2 is full can be reduced. Thus, a cache miss rate can be decreased.

What is claimed is:

1. An information processing system, comprising:
   one or more processors prejudice cache memory including a cache tag including a plurality of ways and a cache data area, executing an externally received instruction, and processing data; and
   a processor control device transmitting a reply to the processors at a read request from the processors, including a snoop tag as tag information corresponding to the cache tag of the processor, and including a number of ways of the snoop tag larger than a number of ways of the cache tag of the processor,
   wherein if a cache miss occurs in the processors, if there is a data read request from the processor to the processor control device, and if there is an available way of the snoop tag, then the processor control device updates the available way according to address information as a target of the read request, and transmits the data corresponding to the address information to the processors,
   wherein when the available way is updated, the processor control device does not issue to the processor a request to delete arbitrarily address information from a way storing the arbitrarily address information in the ways of the cache tag.

2. The system according to claim 1, wherein if there is no available way of the snoop tag when the processor issues a read request when a cache miss occurs, then the processor control device deletes any of the address information stored in the way of the snoop tag, and notifies the processor of the information that the address information is to be deleted.

3. The system according to claim 1, wherein the information processing system adopts a system of not transmitting information, from the processor to the processor control device, that address information stored in any way of the cache tag is expelled when a cache miss occurs.

4. A method of updating a cache tag and a snoop tag of an information processing system including one or more processors including cache memory of a plurality of ways formed by a cache tag and a cache data area and executing an instruction and processing data, and a processor control device for transmitting information to the processors at a request from the processors, and including a number of ways of the snoop tag as tag information corresponding to the cache tag of each processor larger than a number of ways of the cache tag of the processors,
   wherein the processor control device transmits data corresponding to the address information to the processors by updating available ways according to the address information as a target of a read request if the processors issue the read request when a cache miss occurs and there are the available ways of the snoop tag,
   wherein when the available way is updated, the processor control device does not issue to the processor a request to delete arbitrarily address information from a way storing the arbitrarily address information in the ways of the cache tag.

5. The method according to claim 4, wherein if there is no available way of the snoop tag when the processor issues an information read request when a cache miss occurs, then the processor control device deletes any of the address information stored in the way of the snoop tag, and notifies the processor of the information that the address information is to be deleted.

6. The method according to claim 4, wherein the information processing system adopts a system of not transmitting information to the processor control device that address information stored in any way of the cache tag is expelled when a cache miss occurs.

7. An information processing board, comprising:

one or more processors including cache memory including a cache tag including a plurality of ways and a cache data area, executing an externally received instruction, and processing data; and a processor control device transmitting a reply to the processors at a read request from the processors, including a snoop tag as tag information corresponding to the cache tag of the processor, and including a number of ways of the snoop tag larger than a number of ways of the cache tag of the processor, wherein when there is a read request from the processor when a cache miss occurs, and if there is an available way of the snoop tag, then the processor control device updates the available way according to address information as a target of the read request, and transmits data corresponding to the address information to the processor, wherein when the available way is updated, the processor control device does not issue to the processor a request to delete arbitrarily address information from a way storing the arbitrarily address information in the ways of the cache tag.

8. The board according to claim 7, wherein if there is no available way of the snoop tag when the processor issues a read request when a cache miss occurs, then the processor control device deletes any of the address information stored in the way of the snoop tag, and notifies the processor of the information that the address information is to be deleted.

9. The board according to claim 7, wherein the information processing system adopts a system of not transmitting information, from the processor to the processor control device, that address information stored in any way of the cache tag is expelled when a cache miss occurs.

* * * * *